US012067216B2

(12) United States Patent
Bliss et al.

(10) Patent No.: US 12,067,216 B2
(45) Date of Patent: *Aug. 20, 2024

(54) CONTEXTUAL CONVERSATIONS FOR A COLLABORATIVE WORKSPACE ENVIRONMENT

(71) Applicant: Microsoft Technology Licensing, LLC, Redmond, WA (US)

(72) Inventors: William James Bliss, Bellevue, WA (US); Larry Jin, Bellevue, WA (US); Richard Taylor, Sammamish, WA (US); Pedro DeRose, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/150,847

(22) Filed: Jan. 6, 2023

(65) Prior Publication Data
US 2023/0152944 A1    May 18, 2023

Related U.S. Application Data

(63) Continuation of application No. 17/493,363, filed on Oct. 4, 2021, now Pat. No. 11,550,449, which is a continuation of application No. 15/445,567, filed on Feb. 28, 2017, now Pat. No. 11,137,879.

(60) Provisional application No. 62/415,883, filed on Nov. 1, 2016.

(51) Int. Cl.
G06F 3/0482    (2013.01)
H04L 12/18    (2006.01)

(52) U.S. Cl.
CPC ........ G06F 3/0482 (2013.01); H04L 12/1822 (2013.01)

(58) Field of Classification Search
None
See application file for complete search history.

(56) References Cited

U.S. PATENT DOCUMENTS

| | | | |
|---|---|---|---|
| 2005/0132298 A1* | 6/2005 | Lueckhoff ........... | H04M 3/5191 715/741 |
| 2006/0155809 A1* | 7/2006 | Arav ................... | G06F 3/04842 709/204 |
| 2011/0313805 A1* | 12/2011 | Heydemann ..... | G06Q 10/06316 705/7.14 |
| 2013/0014023 A1* | 1/2013 | Lee ...................... | G06Q 10/101 715/751 |
| 2013/0031208 A1* | 1/2013 | Linton .................... | G09B 7/02 709/217 |
| 2014/0215340 A1* | 7/2014 | Shetty ..................... | G06F 3/167 715/810 |
| 2015/0100872 A1* | 4/2015 | Beezer .................. | G06F 3/0482 715/230 |

(Continued)

Primary Examiner — Tuyetlien T Tran
(74) Attorney, Agent, or Firm — NovoTechIP International PLLC

(57) ABSTRACT

Described herein is a user interface that enables messages within a collaborative workspace environment to be propagated to different workspaces that are associated with different tabs in the collaborative workspace environment. Thus, a comment made in a workspace associated with a first tab is reflected in a workspace associated with a different tab and vice versa.

20 Claims, 14 Drawing Sheets

(56) References Cited

U.S. PATENT DOCUMENTS

| | | | |
|---|---|---|---|
| 2015/0143235 A1* | 5/2015 | Krause | G06F 3/0485 |
| | | | 715/270 |
| 2015/0302338 A1* | 10/2015 | Zaveri | H04L 67/1001 |
| | | | 705/7.39 |
| 2015/0363092 A1* | 12/2015 | Morton | G06F 3/04817 |
| | | | 715/752 |
| 2016/0070688 A1* | 3/2016 | Yao | G06F 40/169 |
| | | | 715/232 |
| 2016/0285890 A1* | 9/2016 | Beausoleil | G06F 3/04817 |
| 2016/0364368 A1* | 12/2016 | Chen | G06Q 10/107 |
| 2018/0103074 A1* | 4/2018 | Rosenberg | H04L 65/403 |
| 2020/0044996 A1* | 2/2020 | Johnson | H04L 51/046 |

* cited by examiner

CONTEXTUAL CONVERSATIONS FOR A COLLABORATIVE WORKSPACE ENVIRONMENT

CROSS-REFERENCE TO RELATED APPLICATIONS

This application is a continuation of U.S. patent application Ser. No. 15/445,567, titled "CONTEXTUAL CONVERSATIONS FOR A COLLABORATIVE WORKSPACE ENVIRONMENT," filed on Feb. 28, 2017, which claims priority to U.S. Provisional Application No. 62/415,883, entitled "Contextual Conversations for a Collaborative Workspace Environment," filed on Nov. 1, 2016, which are incorporated hereto by reference in its entirety.

BACKGROUND OF THE INVENTION

In current collaborative workspace environments, there is no notion of allowing a user to seamlessly switch between different tasks in various groups the user may be associated with, provide comments about content that is shared in the workspace and have conversations about the content.

It is with respect to these and other general considerations that embodiments have been described. Also, although relatively specific problems have been discussed, it should be understood that the embodiments should not be limited to solving the specific problems identified in the background.

BRIEF SUMMARY OF THE INVENTION

Non-limiting and non-exhaustive examples are described with reference to the following Figures.

FIG. 1 illustrates an example system for providing a collaborative workspace environment.

FIG. 2 illustrates an example user interface having various channels and selectable tabs.

FIG. 3 illustrates a conversation pane in a tab associated with an entity in the user interface.

FIG. 4 illustrates a comment that is added to the conversation pane of FIG. 3.

FIG. 5 illustrates that the comment added in FIG. 4 has also been added to a "Conversations" tab in the user interface.

FIG. 6 illustrates a comment being added to the "Conversations" tab of the user interface.

FIG. 7 illustrates that the comment that was added in FIG. 6 is reflected in the conversation pane in the tab associated with the entity.

FIG. 8 illustrates a conversation pane that may be accessible within an entity of the collaborative workspace environment.

FIG. 9 illustrates a method for displaying input that is received in a conversation pane on one canvas as a representation of the input on another canvas according to one or more embodiments.

FIG. 10 is a block diagram illustrating example physical components of a computing device with which aspects of the disclosure may be practiced.

FIGS. 11A and 11B are simplified block diagrams of a mobile computing device with which aspects of the present disclosure may be practiced.

FIG. 12 is a simplified block diagram of a distributed computing system in which aspects of the present disclosure may be practiced.

FIG. 13 illustrates a tablet computing device for executing one or more aspects of the present disclosure.

BRIEF DESCRIPTION OF THE DRAWINGS

In an implementation, a first user device includes a processor and a computer-readable medium in communication with the processor. The computer-readable medium includes instructions that, when executed by the processor, cause the processor to control the first user device to perform establishing, via a communication network, a network connection with a data storage system storing and managing a data collection associated with a category including a plurality of subcategories, the data collection including a plurality of data sets received from a plurality of user devices including the first user device, each data set associated with one of the plurality of subcategories and one of a plurality of data types; displaying, via a display, a graphical user interface (GUI) associated with the category, the GUI including a plurality of selectable visual elements associated with a different one of a plurality of canvases, wherein the plurality of canvases includes first and second canvases, and the plurality of selectable visual elements includes a first selectable visual element associated with the first canvas configured to display the data sets associated with a first subcategory of the plurality of subcategories and a second selectable visual element associated with the second canvas configured to display of the data sets associated with a first data type of the plurality of data types; receiving, via a user interface, a first user input selecting the first visual element associated with the first canvas; in response to receiving the first user input, performing: transmitting, to the data storage system via the communication network, a first request for a first set of the data sets associated with the first subcategory; receiving, from the data storage system via the communication network, the first set of data sets; and displaying, via the GUI, the first canvas showing the first set of the data sets associated with the first subcategory, wherein the first canvas includes a plurality of sections, each section corresponds to one of the plurality of data types, each section is configured to display the data sets of the corresponding data type, and the plurality of sections includes a first section corresponding to the first data type; receiving, via the user interface, a second user input entering, via the first section of the first canvas, a first data; determining, based on the first data set being entered via the first section of the first canvas, that the first data set is associated with the first subcategory and first data type; transmitting, to the data storage system via the communication network, the first data set and a first indication that the first data set is associated with the first subcategory and first data type, wherein the data storage system is configured to update the data collection based on the first data set and the first indication transmitted from the first user device; after transmitting the first data set and the first indication to the data storage system, receiving, via the user interface, a third user input selecting the second selectable visual element associated with the second canvas; in response to receiving the third user input, transmitting, to the data storage system via the communication network, a first request to provide a second set of the data sets of the plurality of subcategories that are associated with the first data type; receiving, from the data storage system via the communication network, the second set of the data sets; and in response to receiving the second set of the data sets, displaying, via the GUI, the second set of the data sets in the second canvas, the second set of data sets divided into a plurality of data set groups corresponding to the plurality of subcategories, respectively, each data set group configured to display the data sets associated with the first data type of the corresponding subcategory, wherein the plurality of data set groups includes a first data set group showing a first group of the data sets of the first data type associated with the first subcategory; and a second data set group showing a second group of the data sets of the first data type associated with a second subcategory of the plurality of subcategories, the second group of the data sets including a second data set of the first data type and associated with the second subcategories.

In another implementation, a method of operating a first user device includes establishing, via a communication network, a network connection with a data storage system storing and managing a data collection associated with a category including a plurality of subcategories, the data collection including a plurality of data sets received from a plurality of user devices including the first user device, each data set associated with one of the plurality of subcategories and one of a plurality of data types; displaying, via a display, a graphical user interface (GUI) associated with the category, the GUI including a plurality of selectable visual elements associated with a different one of a plurality of canvases, wherein the plurality of canvases includes first and second canvases, and the plurality of selectable visual elements includes a first selectable visual element associated with the first canvas configured to display the data sets associated with a first subcategory of the plurality of subcategories and a second selectable visual element associated with the second canvas configured to display of the data sets associated with a first data type of the plurality of data types; receiving, via a user interface, a first user input selecting the first visual element associated with the first canvas; in response to receiving the first user input, performing: transmitting, to the data storage system via the communication network, a first request for a first set of the data sets associated with the first subcategory; receiving, from the data storage system via the communication network, the first set of data sets; and displaying, via the GUI, the first canvas showing the first set of the data sets associated with the first subcategory, wherein the first canvas includes a plurality of sections, each section corresponds to one of the plurality of data types, each section is configured to display the data sets of the corresponding data type, and the plurality of sections includes a first section corresponding to the first data type; receiving, via the user interface, a second user input entering, via the first section of the first canvas, a first data; determining, based on the first data set being entered via the first section of the first canvas, that the first data set is associated with the first subcategory and first data type; transmitting, to the data storage system via the communication network, the first data set and a first indication that the first data set is associated with the first subcategory and first data type, wherein the data storage system is configured to update the data collection based on the first data set and the first indication transmitted from the first user device; after transmitting the first data set and the first indication to the data storage system, receiving, via the user interface, a third user input selecting the second selectable visual element associated with the second canvas; in response to receiving the third user input, transmitting, to the data storage system via the communication network, a first request to provide a second set of the data sets of the plurality of subcategories that are associated with the first data type; receiving, from the data storage system via the communication network, the second set of the data sets; and in response to receiving the second set of the data sets, displaying, via the GUI, the second set of the data sets in the second canvas, the second set of data sets divided into a plurality of data set groups corresponding to the plurality of subcategories, respectively, each data set group configured to display the data sets associated with the first data type of the corresponding subcategory, wherein the plurality of data set groups includes a first data set group showing a first group of the data sets of the first data type associated with the first subcategory; and a second data set group showing a second group of the data sets of the first data type associated with a second subcategory of the plurality of subcategories, the second group of the data sets including a second data set of the first data type and associated with the second subcategories.

Figure 1:
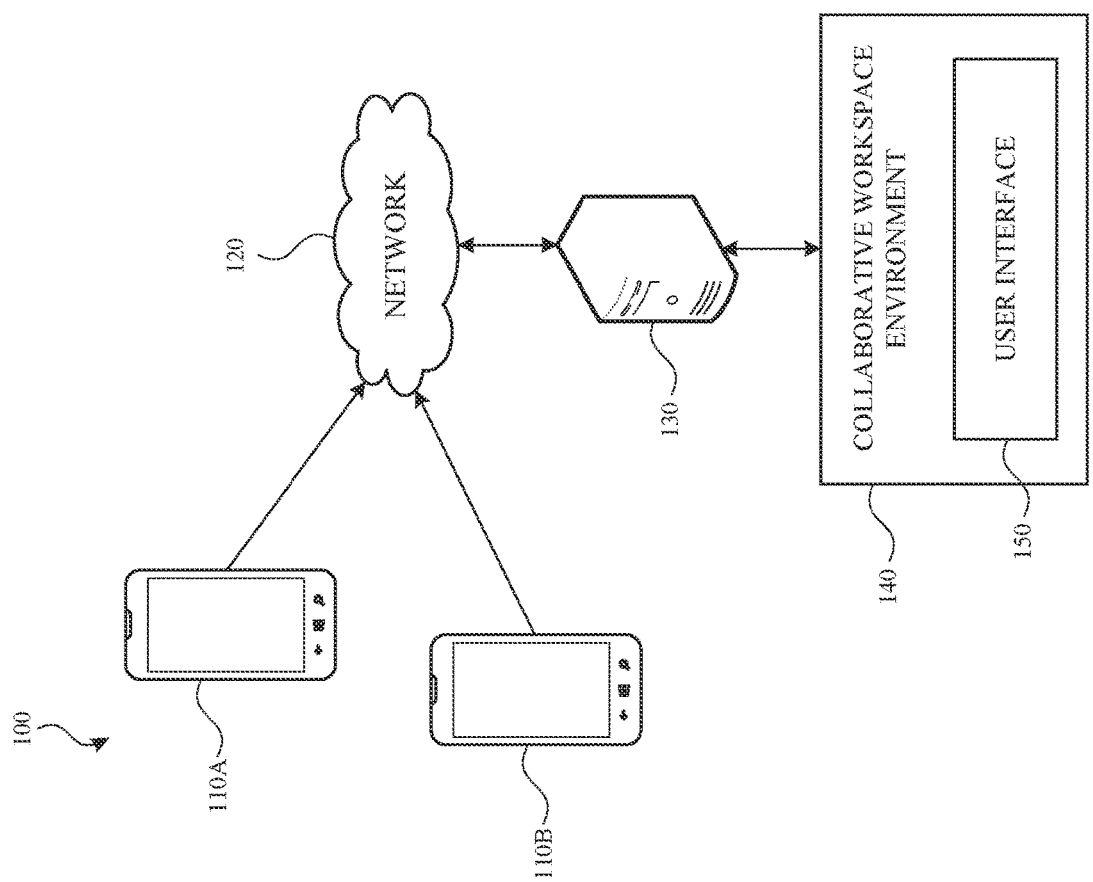

In another implementation, a non-transitory computer-readable medium includes instructions that, when executed by a processor, cause the processor to control a first user device to perform establishing, via a communication network, a network connection with a data storage system storing and managing a data collection associated with a category including a plurality of subcategories, the data collection including a plurality of data sets received from a plurality of user devices including the first user device, each data set associated with one of the plurality of subcategories and one of a plurality of data types; displaying, via a display, a graphical user interface (GUI) associated with the category, the GUI including a plurality of selectable visual elements associated with a different one of a plurality of canvases, wherein the plurality of canvases includes first and second canvases, and the plurality of selectable visual elements includes a first selectable visual element associated with the first canvas configured to display the data sets associated with a first subcategory of the plurality of subcategories and a second selectable visual element associated with the second canvas configured to display of the data sets associated with a first data type of the plurality of data types; receiving, via a user interface, a first user input selecting the first visual element associated with the first canvas; in response to receiving the first user input, performing: transmitting, to the data storage system via the communication network, a first request for a first set of the data sets associated with the first subcategory; receiving, from the data storage system via the communication network, the first set of data sets; and displaying, via the GUI, the first canvas showing the first set of the data sets associated with the first subcategory, wherein the first canvas includes a plurality of sections, each section corresponds to one of the plurality of data types, each section is configured to display the data sets of the corresponding data type, and the plurality of sections includes a first section corresponding to the first data type; receiving, via the user interface, a second user input entering, via the first section of the first canvas, a first data; determining, based on the first data set being entered via the first section of the first canvas, that the first data set is associated with the first subcategory and first data type; transmitting, to the data storage system via the communication network, the first data set and a first indication that the first data set is associated with the first subcategory and first data type, wherein the data storage system is configured to update the data collection based on the first data set and the first indication transmitted from the first user device; after transmitting the first data set and the first indication to the data storage system, receiving, via the user interface, a third user input selecting the second selectable visual element associated with the second canvas; in response to receiving the third user input, transmitting, to the data storage system via the communication network, a first request to provide a second set of the data sets of the plurality of subcategories that are associated with the first data type; receiving, from the data storage system via the communication network, the second set of the data sets; and in response to receiving the second set of the data sets, displaying, via the GUI, the second set of the data sets in the second canvas, the second set of data sets divided into a plurality of data set groups corresponding to the plurality of subcategories, respectively, each data set group configured to display the data sets associated with the first data type of the corresponding subcategory, wherein the plurality of data set groups includes a first data set group showing a first group of the data sets of the first data type associated with the first subcategory; and a second data set group showing a second group of the data sets of the first data type associated with a second subcategory of the plurality of subcategories, the second group of the data sets including a second data set of the first data type and associated with the second subcategories.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION OF THE INVENTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

The disclosure generally relates to a user interface for a collaborative workspace environment. In general, the collaborative workspace environment displays or otherwise provides a user access to multiple groups in the collaborative workspace environment. Each group may have one or more channels or contexts and each channel or context has a workspace in which content or an entity may be displayed and/or shared with other members of the group. Each member of the group, may access, edit, comment, post or otherwise interact with the entity that is displayed in the workspace.

As used herein, a context may refer to a tenant in a multi-tenant environment, a team, a channel, a topic, etc. Additionally, as used herein, the term entity means an item within or otherwise provided by service. The entity may be a document, a task, a board and other such content provided by a service. Further, the term entity and content may be used interchangeably. The term service may be any product that provides content. For example, a product may be a word processing application, a workflow management application and so on. The service may be a third-party service or a local service that the collaborative workspace environment has access to. Once an entity is provided in the workspace, each member of the group or users that access the context, may access, edit, comment, post or otherwise interact with the entity.

The user interface includes contextual canvases that are associated with each context. Canvases in each of the contexts may be added, removed and edited. When a canvas is selected, a workspace associated with the canvas is provided on the user interface. In some embodiments, a canvas is associated with or hosts a particular entity from a service.

In embodiments, an entity may be associated with a particular canvas. Further the collaborative workspace environment may allow one or more users to provide comments within the entity—even if the service associated with the entity does not have native commenting capabilities, about the entity and so on. If comments are added to the entity or are otherwise associated with the entity, the comments are reflected in a separate canvas.

For example the user interface may provide comments in a canvas-first view. In this view, the message or conversation appears alongside or is otherwise attached to a canvas that displays the entity. In some embodiments, comments or conversations that are provided within the entity (e.g., using one or more conversation tools associated with the collaborative workspace environment and/or commenting tools that are native to the entity and/or the service that provides the entity) are also shown in the canvas. In one example, the canvas includes a conversation pane that displays all of the comments provided by various members that interact with the entity.

In other instances, the message may be displayed or otherwise provided in a conversation-first view. This view enables various conversations from different canvases to be displayed simultaneously on a single canvas. In some instances, a summary canvas, or other representation of the entity, may be provided along with each of the conversations. The conversations provided in the conversation-first view mirror those that were made in the entity itself or are otherwise associated with the entity.

FIG. 1 illustrates an example system 100 for providing a collaborative workspace environment 140 according to an embodiment. In aspects, a client device, such as for example, client device 110A and client device 110B may access a network 130, or other internet connection, and access the collaborative workspace environment 140 executing on a server computing device 120.

In some embodiments, the client computing device 110 is a personal or handheld computer having both input elements and output elements. For example, the client computing device 110 may be one of: a mobile telephone; a smart phone; a tablet; a phablet; a smart watch; a wearable computer; a personal computer; a desktop computer; a laptop computer; a gaming device/computer (e.g., Xbox); a television; and the like. This list is for example purposes only and should not be considered as limiting. Any suitable client computing device for executing a messaging application may be utilized.

The system 100 is a communication system/service that provides the collaborative workspace environment 140 for users to communicate and collaborate over the network 120. In an example, the collaborative workspace environment 140 provides a configurable and extensible workspace for collaboration between users through a user interface 150 that may comprise a plurality of different views.

Users of the collaborative workspace environment 140 may include but are not limited to: one or more persons, companies, organizations, departments, virtual teams, ad-hoc groups, vendors, customers, third-parties, etc. The collaborative workspace environment 140 enables visibility and communication between users including users who are organized in teams or groups as well as users/groups outside of a team/group.

More specifically, when a user accesses the collaborative workspace environment 140, the user may have access to one or more groups. Each group may be associated with various contexts that have a particular set of entities or other content. One or more canvases are associated with each context and each canvas has an associated workspace in which an entity, that is related to or otherwise filtered for the canvas and/or the context is displayed. By selecting the various canvases that are displayed, different entities, associated with each canvas, is provided in the workspace.

In some instances, each canvas may be used to provide an entity that multiple users may access, edit, and/or create. The entity may be provided by various services—both local services (e.g., services, applications and products provided or otherwise hosted by the server 120) and external or third party services. Example services include, but are not limited to, word processing applications or services, spreadsheet applications or services, line-of-business (LOB) management services, customer relationship management (CRM) services, debugging services, accounting services, payroll services and so on. In other examples, the entity associated with each canvas may include content from websites and/or applications, such as social media or networking websites, photo sharing websites, video and music streaming websites, messaging applications, search engine websites, sports, news or entertainment websites, and the like.

In some instances, these services may provide robust reporting, analytics, data compilation and/or storage service, etc., whereas other services may provide search engines or other access to data and information, images, videos, document processing and the like.

Figure 2:
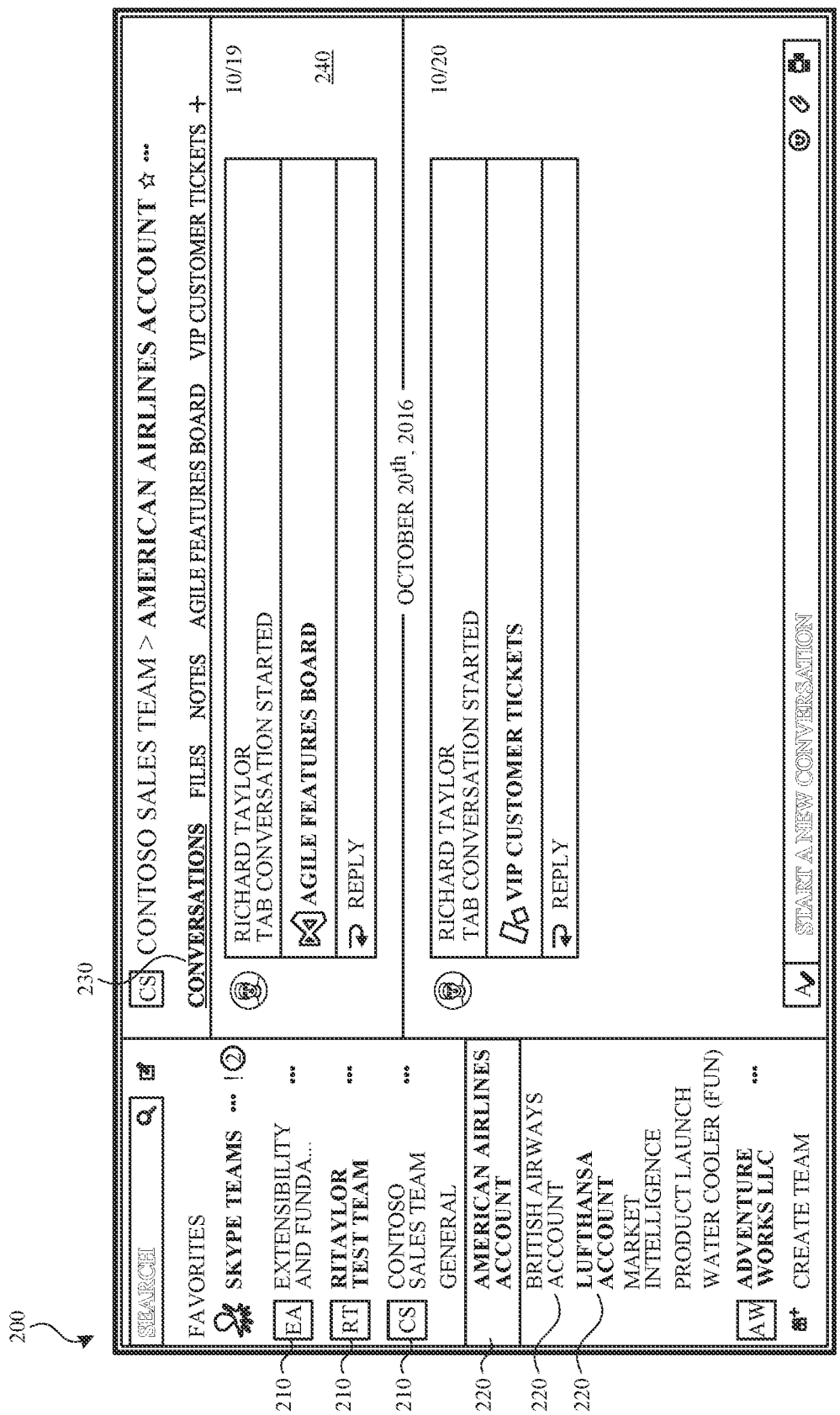

FIG. 2 illustrates an example user interface 200 of a collaborative workspace environment (e.g., the collaborative workspace environment 140 of FIG. 1) of the present disclosure. The user interface 200 may be similar to the user interface 150 described above in FIG. 1.

In aspects, the user interface 200 shows various groups 210. Each group 210 may be associated with multiple members or users. In addition, each group 210 may include one or more contexts 220. For example, the "Contoso sale team group" includes an "American Airlines account" context, a "British Airways account" context, a "Lufthansa account" context, a "Market Intelligence" context, a "Product Launch" context and a "Water Cooler (fun)" context. Each of the groups and contexts shown are for example purposes only.

Once a particular context 220 is selected, various canvases 230 associated with the context 220 are provided in the user interface 200. The canvases 230 are used to display entities that has been selected, created or filtered for each canvas.

In this example, the Contoso sales team channel 210 include a "Conversations" canvas, a "Files" canvas, a "Notes" canvas, an "Agile Features Board" canvas and a "VIP Customer Tickets" canvas. Each canvas 230 is associated with a workspace 240 that provides or otherwise displays an entity or other such content. In some instances, one or more entities are associated with each canvas. Further, and as will be described below, each canvas, or each entity or service associated with a canvas, may also be associated with a conversation pane. The conversation pane enables one or more members that access the canvas to provide comments about the service and/or entity associated with the canvas. In some instances, the collaborative workspace environment has commenting tools that enable comments to be made within the entity. In other instances, the commenting tools may be used to provide comments about the entity. In yet other implementations, the commenting tools may be used to provide the comments (and context for the comments) within a user interface of the service that provided the entity. In each of these cases, the comments may be provided in the conversation pane.

Figure 3:
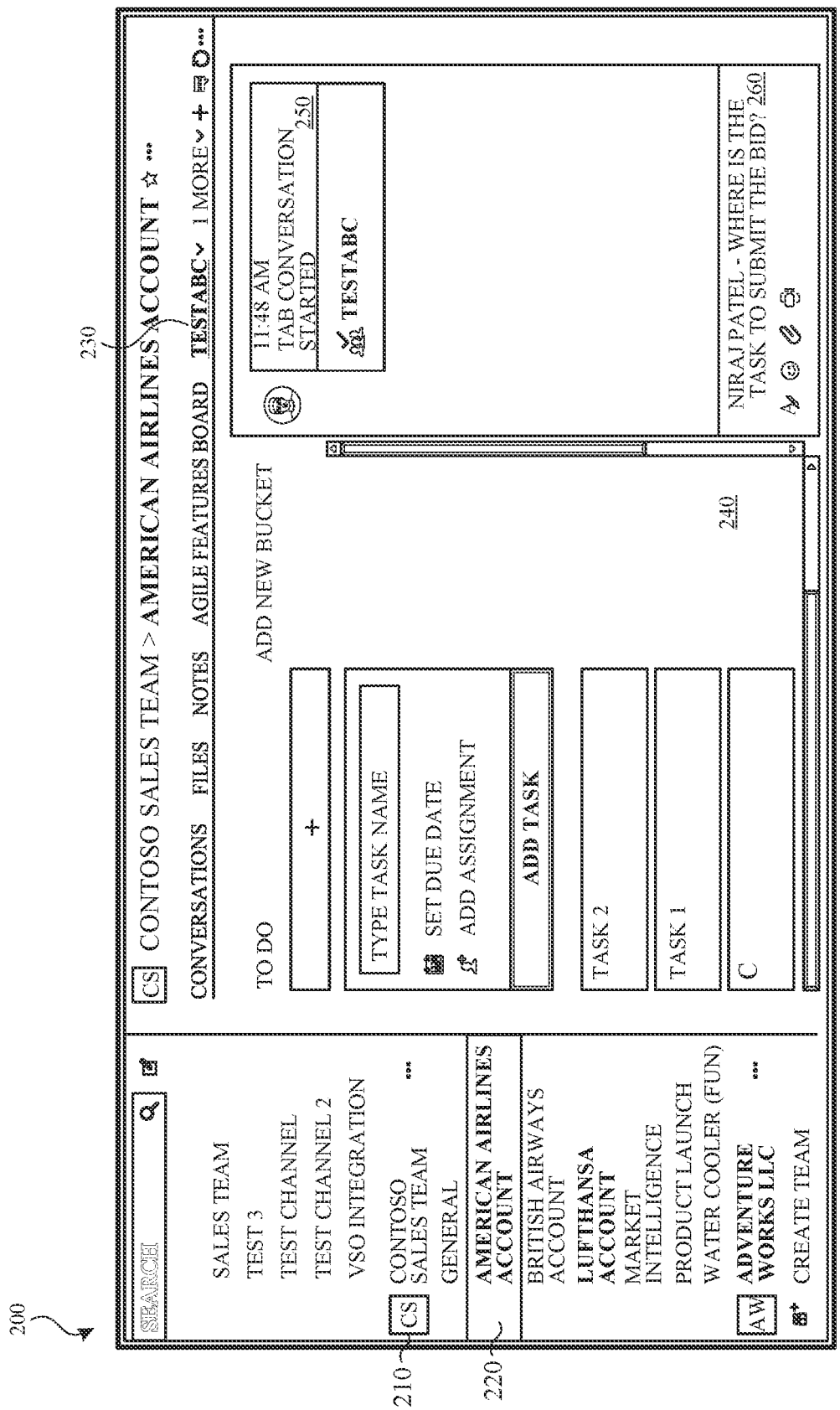

For example, and turning to FIG. 3, a "testabc" canvas has been added to the American Airlines account context. When the "testabc" canvas has been selected, a workspace 240 associated with the canvas 230 is output on the user interface 200. As discussed above, an entity is associated with a canvas. For example, an entity may be pinned as a canvas or may be included within a canvas. In this example, the entity is a task manager that enables users to add various tasks, appointments, due dates and so on. Although a task manager is shown and described, the entity may be any type of entity provided by a service such as, for example, a dashboard, a word processing document, a spreadsheet, a chart, a graph, an image, and a video and so on.

Figure 4:
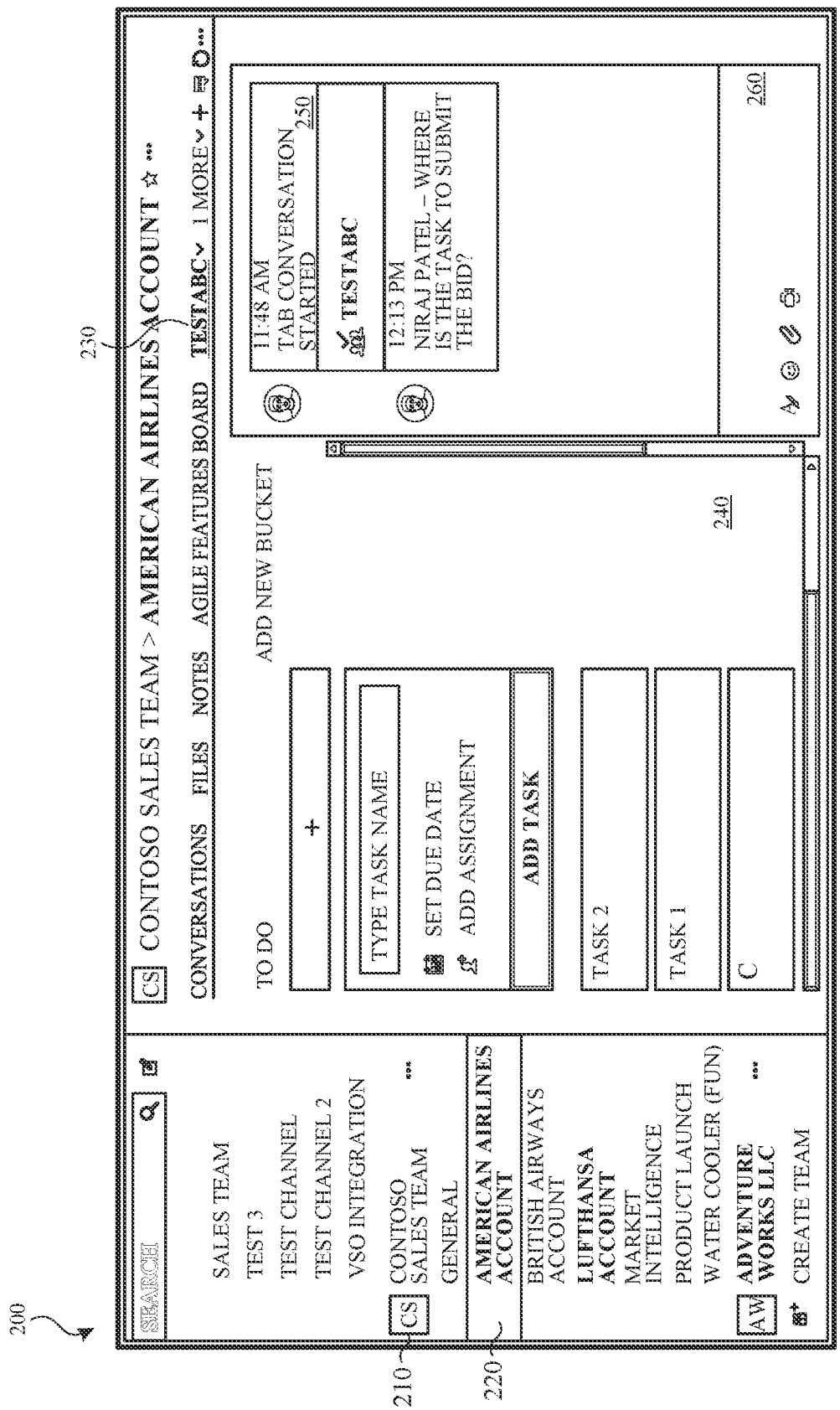

In embodiments, the workspace 240 includes a conversation pane 250. The conversation pane 250 allows various members of the group 210 that access the context 220 to provide comments about the entity. For example, a member of the group may provide a comment in a text area 260 of the conversation pane 250 about the entity itself (e.g., the task manager) and/or one or more tasks that are shown in the tab 230. In another implementation, commenting tools associated with the collaborative workspace environment may be used to provide comments within the entity—even if the entity, or the service that provides the entity, does not have native commenting capabilities. Once the member has finished providing the comment, it is displayed in the conversation pane 250 such as shown in FIG. 4. This is an example of a canvas-first view.

Figure 5:
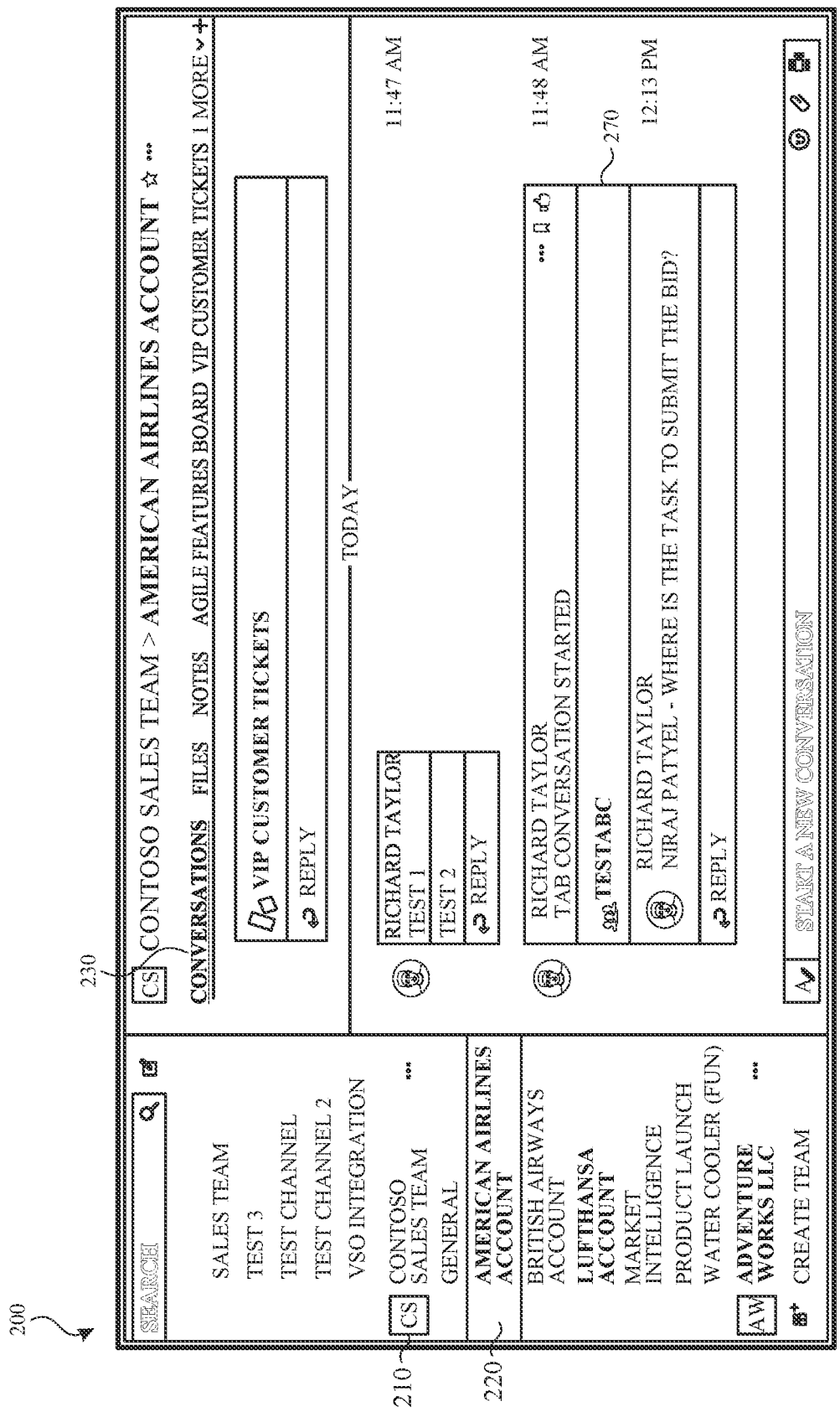

In addition, the comment that was provided in the conversation pane 250 is also provided in a different canvas that is associated with the context. More specifically, and turning to FIG. 5, the comment that was added in the conversation pane 250 of FIG. 4 is also shown "Conversations" canvas of the user interface 200. The example shown in FIG. 5 is a conversation-first view.

In the conversation-first view, a summary canvas or some other representation 270 of the canvas or entity in which the comment was made is generated and provided in the user interface 200. For example, a "testabc" representation 270 is generated and provided in the "Conversations" canvas such as shown. As also shown, the comment "where is the task to submit the bid?" that was provided in the "testabc" canvas is associated with or otherwise provided along with the representation 270. Thus, when a conversation about a canvas or an entity contained within or otherwise associated with a canvas occurs, a separate conversation thread about that entity is created. All additional messages or conversations about that entity may then be grouped together in a single display—regardless of which user made the comment, where the comment was made (e.g., within the entity, within a user interface of the service that provided the entity and so on) and regardless of the service that provided the entity.

Thus, a member of the channel 220 can view all conversations that occur in a particular context by accessing a single canvas and anything that is provided in the "Conversation" canvas has been filtered or is otherwise deemed relevant to the context. In aspects, the conversations in the "Conversations" canvas are viewable by each member that accesses the context 220. In other implementations, certain conversations may be visible to members that have permissions to access a particular context and/or a particular canvas associated with the context.

In some embodiments, the representation 270 has the same or similar name as the canvas 230 and/or the entity it is associated with. In addition, when the representation 270 is selected, the user interface 200 returns to the corresponding canvas, service and/or entity. Thus, in this example, selection of the "testabc" representation 270 causes the user interface 200 to display the "testabc" canvas.

Figure 6:
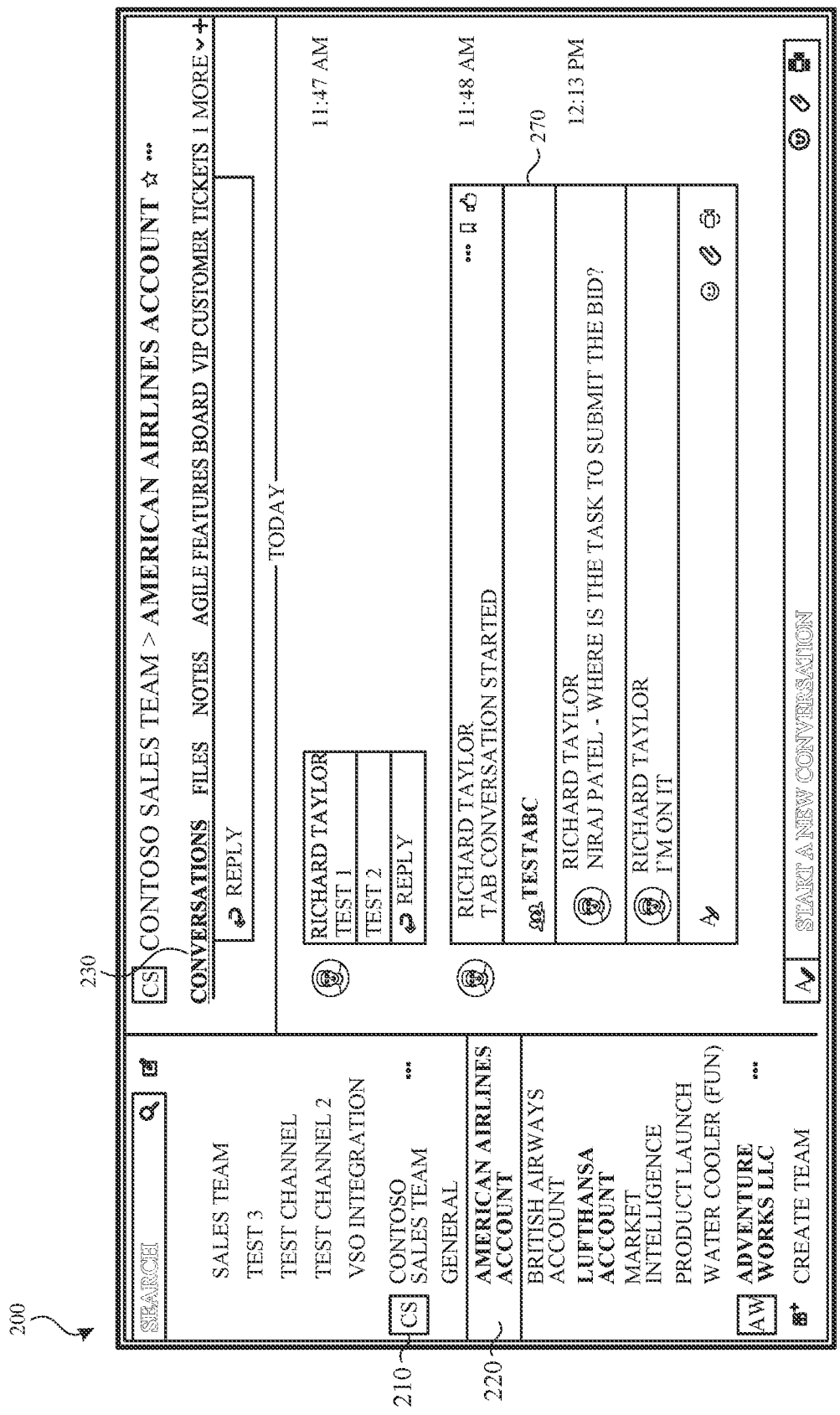
Figure 7:
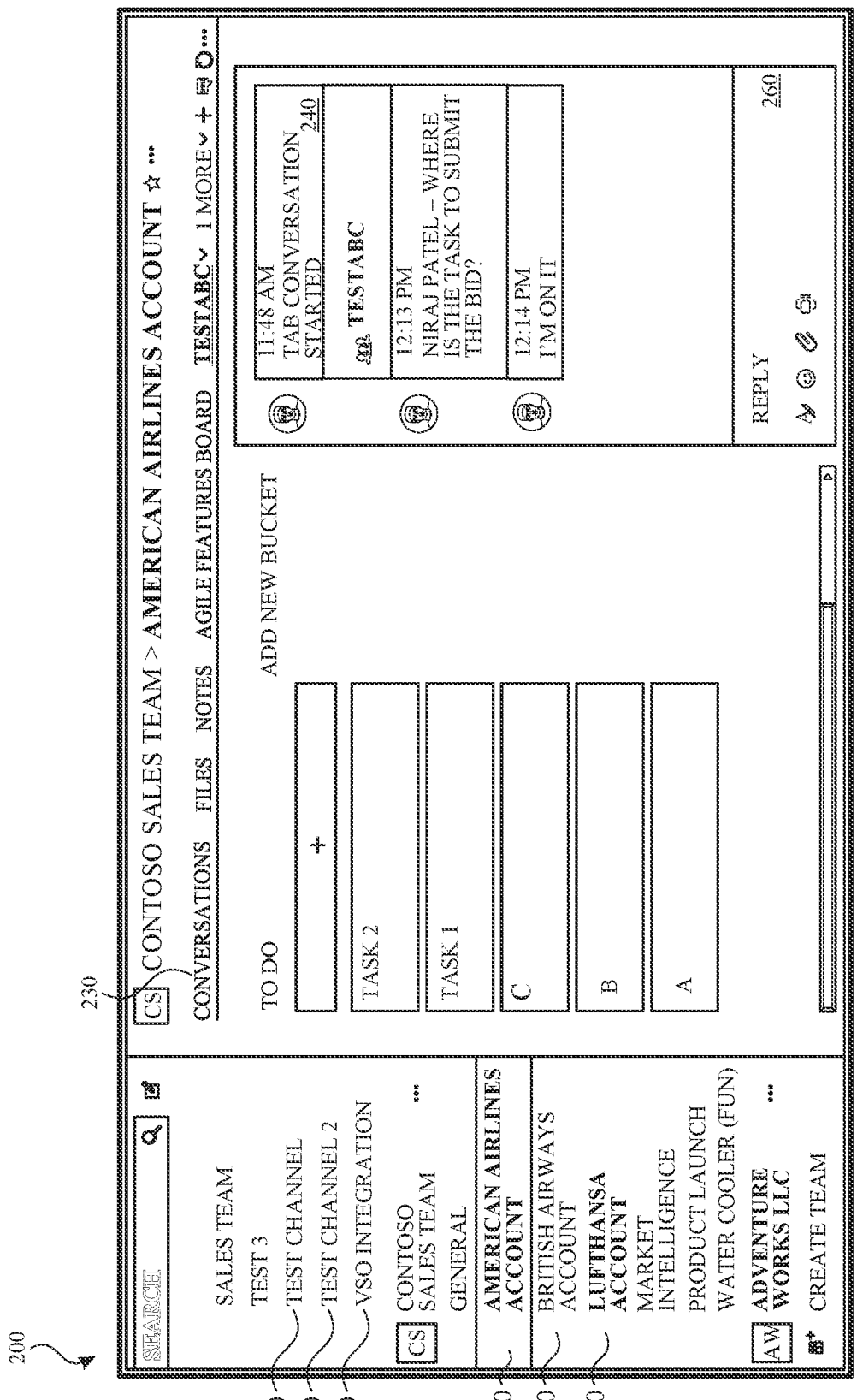

In aspects, the representation 270 also allows members of the context 220 to provide comments. Those comments are then reflected or otherwise provided in the conversation pane and canvas that is associated with the representation 270. For example, and as shown in FIG. 6, a comment "I'm on it" has been added to the representation 270 in the "Conversations" canvas. Upon selection of the representation 270, any comment associated with the representation 270, or the "testabc" canvas, the user interface 200 displays conversation pane 240 of the "testabc" canvas. As shown, the comment "I'm on it" that was provided in the "Conversations" canvas, is also shown in the conversation pane 240.

As previously discussed, the embodiments described herein enable comments to be placed or otherwise associated with an entity provided by a service, in addition to comments in a conversation pane 270—even if the entity does not include native commenting capabilities. When a comment is made directly in the entity, that comment may also be shown with a representation of the entity (or a representation of the tab that the entity is associated with) on the "Conversations" canvas such as described above. In some embodiments, selection of the representation, or a particular comment associated with the representation, will cause the user interface 200 to display the location within the entity that the comment was made or otherwise relates to.

For example, if the entity is a word processing document and a comment was made at paragraph thirty-three, that comment is shown in the "Conversations" canvas (or a conversation pane in a canvas associated with the entity) along with a corresponding representation. Selection of the comment (or the representation) causes the user interface to display the word processing document and navigate to paragraph thirty-three. The comment about paragraph thirty-three may also be displayed. Thus, various comments may be given their proper context within the entity. In some implementations, comments about the entity made in the collaborative workspace environment may be displayed within the user interface of the service that provided the comment.

Using the described user interface various users of the collaborative workspace environment, including users that are following a particular context, chat or conversation, can see and respond to comments, even if they were made by another user. Upon selection of a comment, and entity or a representation, the user may be taken to the canvas or the entity and continue to make comments.

Figure 8:
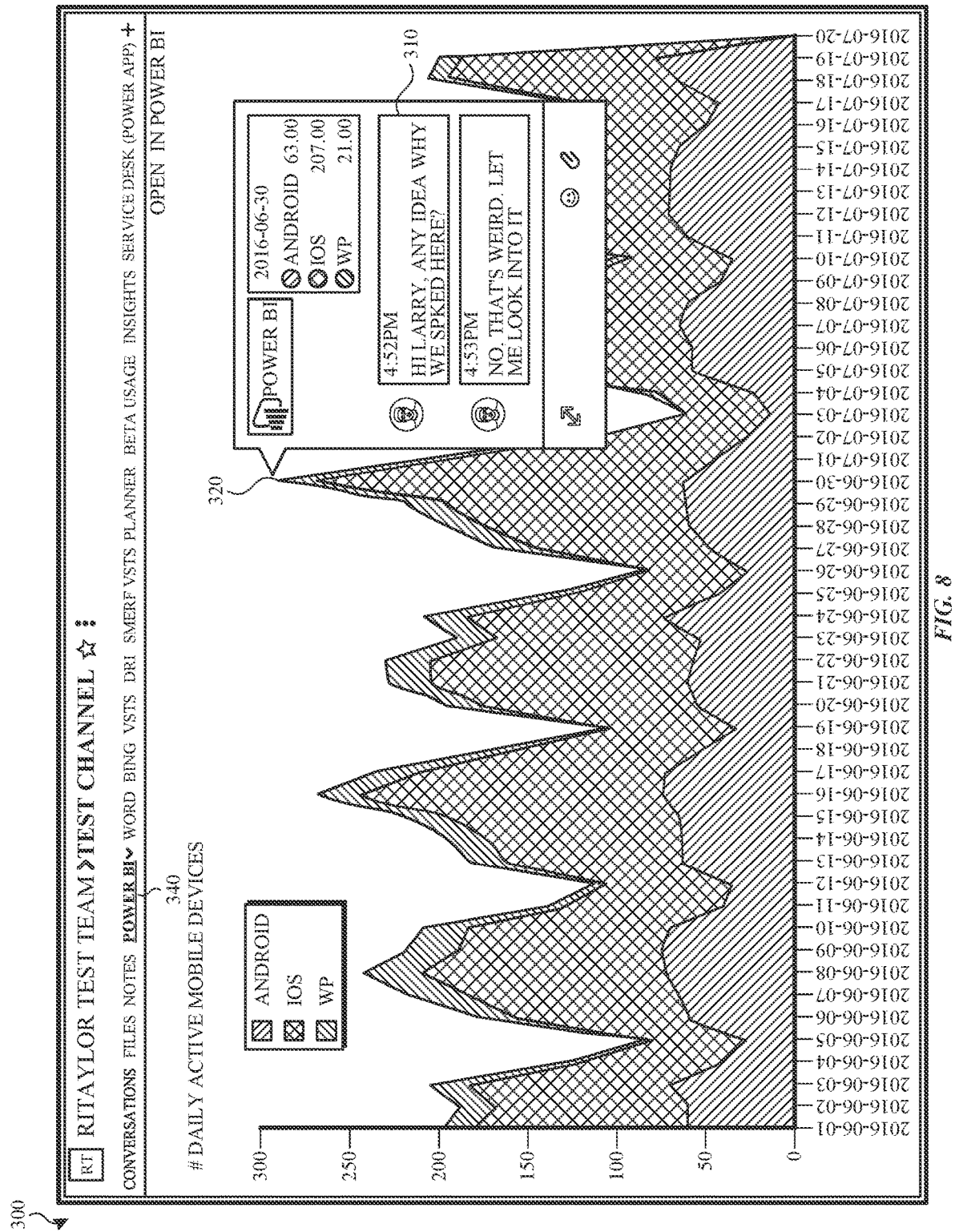

FIG. 8 illustrates a conversation pane 310 that may be accessible within a user interface 300 of a collaborative workspace environment. In this particular example, the entity is an interactive data visualization tool. The entity itself is displayed as a canvas 340 (e.g., the "Power BI" tab 330). As discussed above, the user interface 300 enables a comment pane 310 to be associated with the entity. Further, the comment pane 310 may be associated with specified content within the entity.

In the example shown, the data corresponding to point 320 within the entity has two comments associated with it in the conversations pane 310. As described above, these comments may also be provided in a "Conversations" canvas such as described above. Further, the "Power BI" canvas 340 may also have a representation provided in the "Conversations" tab. Any additional comments made in the conversation pane 310 and also reflected in the "Conversations" canvas and vice versa.

Further, selection of the representation, or the comments associated with the representation, in the "Conversations" canvas returns the user to the data point 320. That is, if a member selects the comment "No. That's weird. Let me look into it" in the "Conversations" canvas, the user interface will transition to the "Power BI" canvas 340 and the entity will display the data point (e.g., data point 320) that the comment relates to.

In some embodiments, the conversations tools of the collaborative workspace environment may be used to start a conversation within an entity provided in a user interface of an external or third-party service. In another implementation, comments made about an entity in the user interface of the third-party service may also be displayed in one or more canvases of the collaborative workspace environment.

For example, a user can open a local calendar, select a task and add a comment about that task. That comment may be provided in the "Conversations" canvas of the user interface. Any additional comments that are made in the "Conversations" canvas may also be reflected in the user interface of the third-party service. This allows comments to made or otherwise associated with entities even when the entity does not have native commenting capabilities.

The embodiments described above may also incorporate comments made by or in an electronic messaging forum (e.g., chat rooms, chat panes, electronic messages and the like). The electronic messaging forum may be provided by a third party of may be part of the collaborative workspace environment. When a message or conversation is sent to, from or otherwise hosted by the electronic messaging forum, the message, or a copy of the message, may be injected directly into the Conversation tab, an entity, or a tab associated with the entity such as described above.

Figure 9:
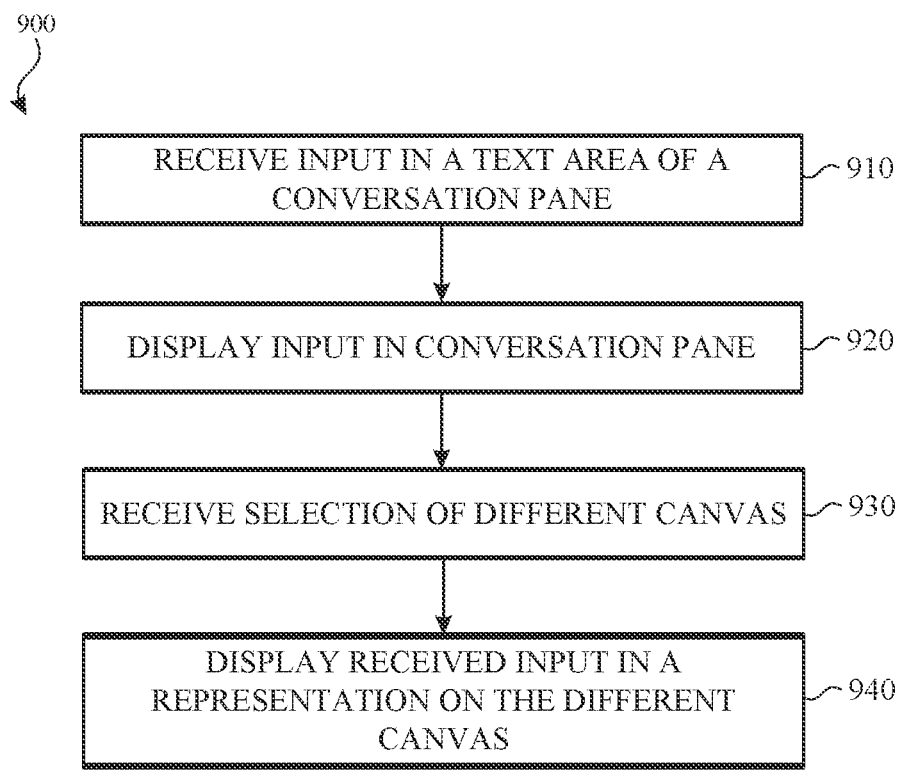

FIG. 9 illustrates a method 900 for displaying input that is received in a conversation pane on one canvas as a representation of the input on another canvas according to one or more embodiments. The method 900 may be used to provide comments in the example user interfaces described above.

Method 900 begins at operation 910 in which input is received in a text area of a conversation pane that is associated with a particular canvas. As described above, the canvas may be associated with a particular context. Therefore, when a particular canvas is selected, a workspace may be provided on a user interface of a collaborative workspace environment.

The workspace includes a conversation pane that is configured to receive input. The input may be text input, video input, voice input, image input, touch input and so on. The conversation pane allows various members of a group that access the context to provide comments about the entity.

Once the input is received, flow proceeds to operation 920 and the content is displayed in the conversation pane. As described above, this is an example of a canvas-first view.

Flow then proceeds to operation 930 and a selection of a different canvas is selected. In some embodiments, the different canvas may be associated with the same context and/or group as the canvas on which the conversation pane was provided on, or it may be associated with a different group and/or context. The different canvas is then provided on the user interface.

Flow then proceeds to operation 940 and the received input (e.g., the input that was provided in the text area of the conversation pane in operation 910) is displayed in a representation on the different canvas. In some embodiments, the different canvas may have a number of representations that have input that was provided on a number of different canvases.

For example, the different canvas may be canvas that is configured in a conversation-first view. In this view, a summary canvas or some other representation of the canvas or entity in which the comment was made is generated and provided in the user interface. Thus, when a conversation about a canvas or an entity contained within or otherwise associated with a canvas occurs, a separate conversation thread about that entity is created. All additional messages or conversations about that entity may then be grouped together in a single display—regardless of which user made the comment, where the comment was made (e.g., within the entity, within a user interface of the service that provided the entity and so on) and regardless of the service that provided the entity.

Thus and as described above, a member of the channel or a group can view all conversations that occur in a particular context by accessing a single canvas.

FIGS. 10-13 and the associated descriptions provide a discussion of a variety of operating environments in which aspects of the disclosure may be practiced. However, the devices and systems illustrated and discussed with respect to FIGS. 10-13 are for purposes of example and illustration and are not limiting of a vast number of electronic device configurations that may be utilized for practicing aspects of the disclosure, as described herein.

Figure 10:
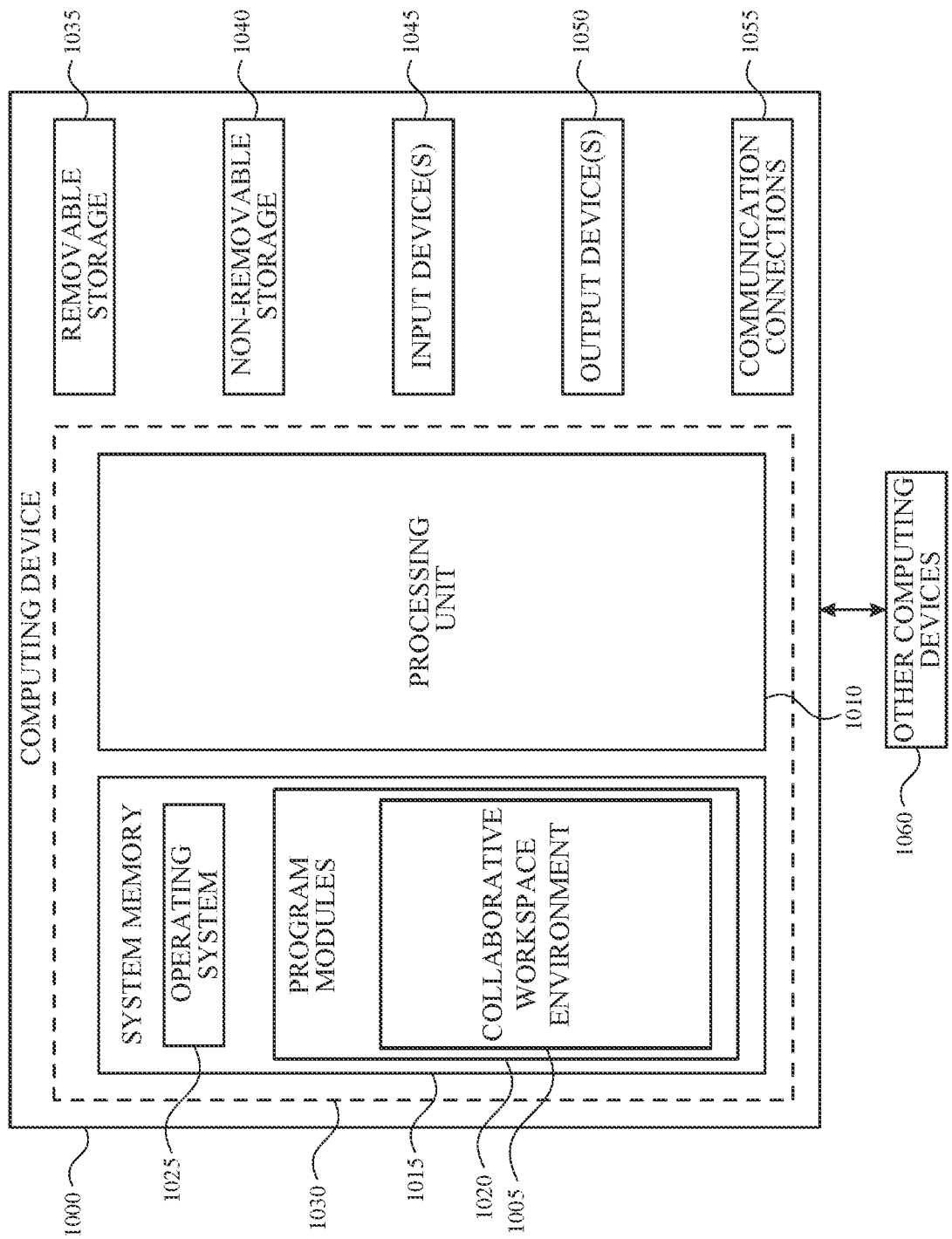

FIG. 10 is a block diagram illustrating physical components (e.g., hardware) of an electronic device 1000 with which aspects of the disclosure may be practiced. The computing device components described below may be suitable for the computing devices described above, including the client computing devices 110A and 110B and the server computing device 120.

In a basic configuration, the electronic device 1000 may include at least one processing unit 1010 and a system memory 1015. Depending on the configuration and type of electronic device, the system memory 1015 may comprise, but is not limited to, volatile storage (e.g., random access memory), non-volatile storage (e.g., read-only memory), flash memory, or any combination of such memories. The system memory 1015 may include an operating system 1025 and one or more program modules 1020 suitable for parsing received input, determining subject matter of received input, determining actions associated with the input and so on.

The operating system 1025, for example, may be suitable for controlling the operation of the electronic device 1000. Furthermore, embodiments of the disclosure may be practiced in conjunction with a graphics library, other operating systems, or any other application program and is not limited to any particular application or system. This basic configuration is illustrated in FIG. 10 by those components within a dashed line 1030.

The electronic device 1000 may have additional features or functionality. For example, the electronic device 1000 may also include additional data storage devices (removable and/or non-removable) such as, for example, magnetic disks, optical disks, or tape. Such additional storage is illustrated in FIG. 10 by a removable storage device 1035 and a non-removable storage device 1040.

As stated above, a number of program modules and data files may be stored in the system memory 1015. While executing on the processing unit 1010, the program modules 1020 (e.g., the content sharing module 1005) may perform processes including, but not limited to, the aspects, as described herein.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 10 may be integrated onto a single integrated circuit. Such an SOC device may include one or more processing units, graphics units, communications units, system virtualization units and various application functionality all of which are integrated (or "burned") onto the chip substrate as a single integrated circuit.

When operating via an SOC, the functionality, described herein, with respect to the capability of client to switch protocols may be operated via application-specific logic integrated with other components of the electronic device 1000 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

The electronic device 1000 may also have one or more input device(s) 1045 such as a keyboard, a trackpad, a mouse, a pen, a sound or voice input device, a touch, force and/or swipe input device, etc. The output device(s) 1050 such as a display, speakers, a printer, etc. may also be included. The aforementioned devices are examples and others may be used. The electronic device 1000 may include one or more communication connections 1055 allowing communications with other electronic devices 1060. Examples of suitable communication connections 1055 include, but are not limited to, radio frequency (RF) transmitter, receiver, and/or transceiver circuitry; universal serial bus (USB), parallel, and/or serial ports.

The term computer-readable media as used herein may include computer storage media. Computer storage media may include volatile and nonvolatile, removable and non-removable media implemented in any method or technology for storage of information, such as computer readable instructions, data structures, or program modules.

The system memory 1015, the removable storage device 1035, and the non-removable storage device 1040 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the electronic device 1000. Any such computer storage media may be part of the electronic device 1000. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 11A:
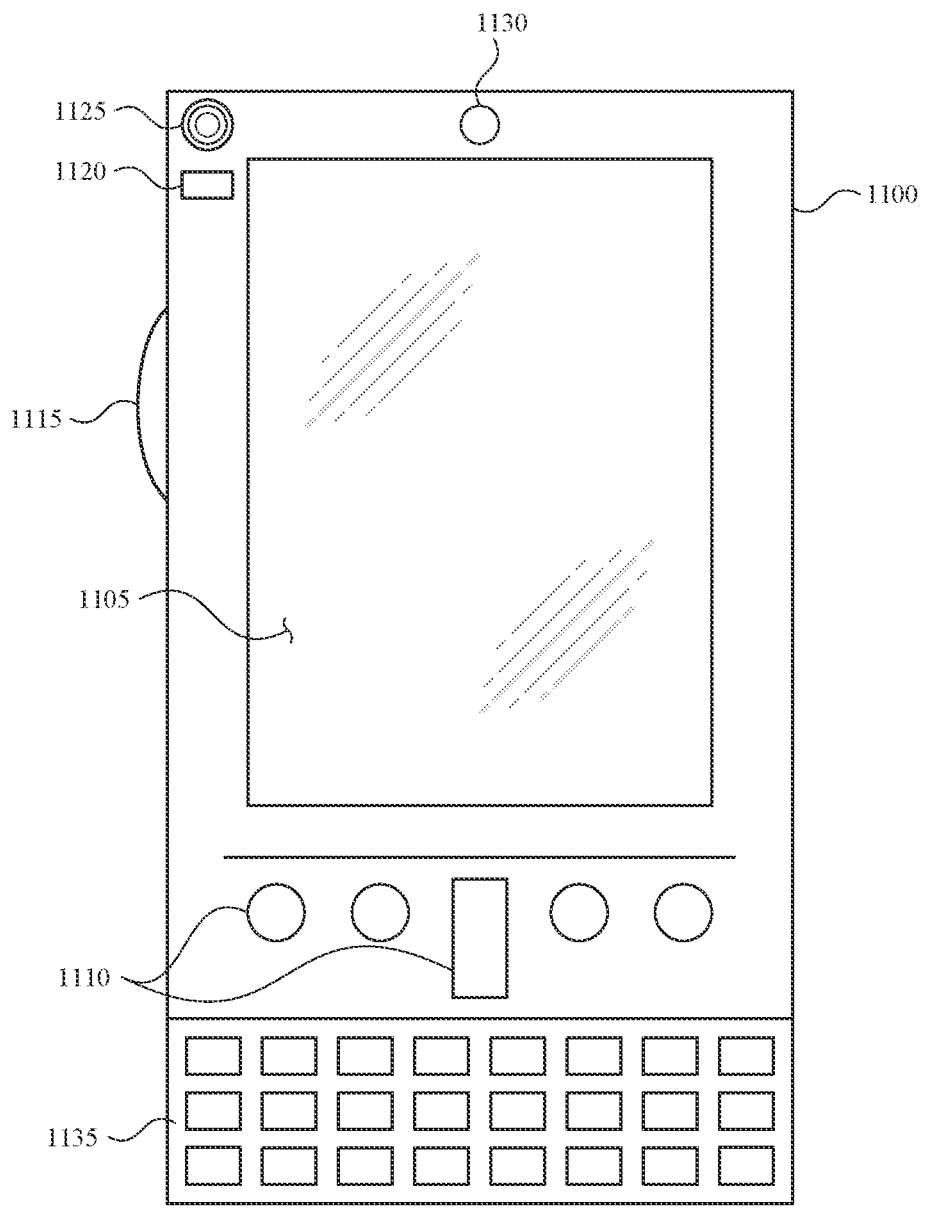
Figure 11B:
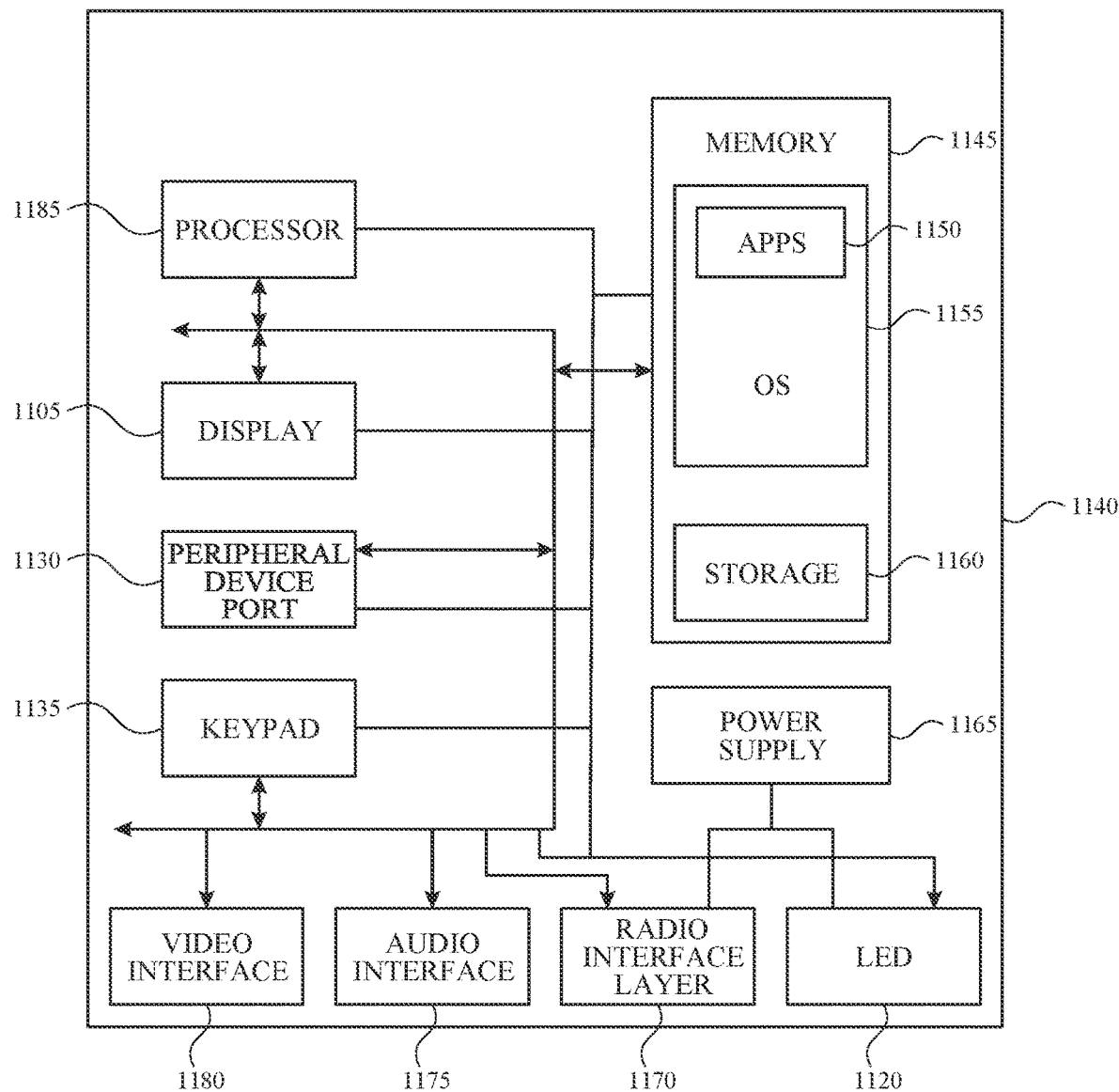

FIGS. 11A and 11B illustrate a mobile electronic device 1100, for example, a mobile telephone, a smart phone, wearable computer (such as a smart watch), a tablet computer, a laptop computer, and the like, with which embodiments of the disclosure may be practiced. With reference to FIG. 11A, one aspect of a mobile electronic device 1100 for implementing the aspects is illustrated.

In a basic configuration, the mobile electronic device 1100 is a handheld computer having both input elements and output elements. The mobile electronic device 1100 typically includes a display 1105 and one or more input buttons 1110 that allow the user to enter information into the mobile electronic device 1100. The display 1105 of the mobile electronic device 1100 may also function as an input device (e.g., a display that accepts touch and/or force input).

If included, an optional side input element 1115 allows further user input. The side input element 1115 may be a rotary switch, a button, or any other type of manual input element. In alternative aspects, mobile electronic device 1100 may incorporate more or less input elements. For example, the display 1105 may not be a touch screen in some embodiments. In yet another alternative embodiment, the mobile electronic device 1100 is a portable phone system, such as a cellular phone. The mobile electronic device 1100 may also include an optional keypad 1135. Optional keypad 1135 may be a physical keypad or a "soft" keypad generated on the touch screen display.

In various embodiments, the output elements include the display 1105 for showing a graphical user interface (GUI), a visual indicator 1120 (e.g., a light emitting diode), and/or an audio transducer 1125 (e.g., a speaker). In some aspects, the mobile electronic device 1100 incorporates a vibration transducer for providing the user with tactile feedback. In yet another aspect, the mobile electronic device 1100 incorporates input and/or output ports, such as an audio input (e.g., a microphone jack), an audio output (e.g., a headphone jack), and a video output (e.g., a HDMI port) for sending signals to or receiving signals from an external device.

FIG. 11B is a block diagram illustrating the architecture of one aspect of a mobile electronic device 1100. That is, the mobile electronic device 1100 can incorporate a system (e.g., an architecture) 1140 to implement some aspects. In one embodiment, the system 1140 is implemented as a "smart phone" capable of running one or more applications (e.g., browser, e-mail, calendaring, contact managers, messaging clients, games, media clients/players, content selection and sharing applications and so on). In some aspects, the system 1140 is integrated as an electronic device, such as an integrated personal digital assistant (PDA) and wireless phone.

One or more application programs 1150 may be loaded into the memory 1145 and run on or in association with the operating system 1155. Examples of the application programs include phone dialer programs, e-mail programs, personal information management (PIM) programs, word processing programs, spreadsheet programs, Internet browser programs, messaging programs, and so forth.

The system 1140 also includes a non-volatile storage area 1160 within the memory 1145. The non-volatile storage area 1160 may be used to store persistent information that should not be lost if the system 1140 is powered down.

The application programs 1150 may use and store information in the non-volatile storage area 1160, such as email or other messages used by an email application, and the like. A synchronization application (not shown) also resides on the system 1140 and is programmed to interact with a corresponding synchronization application resident on a host computer to keep the information stored in the non-volatile storage area 1160 synchronized with corresponding information stored at the host computer.

The system 1140 has a power supply 1165, which may be implemented as one or more batteries. The power supply 1165 may further include an external power source, such as an AC adapter or a powered docking cradle that supplements or recharges the batteries.

The system 1140 may also include a radio interface layer 1170 that performs the function of transmitting and receiving radio frequency communications. The radio interface layer 1170 facilitates wireless connectivity between the system 1140 and the "outside world," via a communications carrier or service provider. Transmissions to and from the radio interface layer 1170 are conducted under control of the operating system 1155. In other words, communications received by the radio interface layer 1170 may be disseminated to the application programs 1150 via the operating system 1155, and vice versa.

The visual indicator 1120 may be used to provide visual notifications, and/or an audio interface 1175 may be used for producing audible notifications via an audio transducer (e.g., audio transducer 1125 illustrated in FIG. 11A). In the illustrated embodiment, the visual indicator 1120 is a light emitting diode (LED) and the audio transducer 1125 may be a speaker. These devices may be directly coupled to the power supply 1165 so that when activated, they remain on for a duration dictated by the notification mechanism even though the processor 1185 and other components might shut down for conserving battery power. The LED may be programmed to remain on indefinitely until the user takes action to indicate the powered-on status of the device.

The audio interface 1175 is used to provide audible signals to and receive audible signals from the user (e.g., voice input such as described above). For example, in addition to being coupled to the audio transducer 1125, the audio interface 1175 may also be coupled to a microphone to receive audible input, such as to facilitate a telephone conversation. In accordance with embodiments of the present disclosure, the microphone may also serve as an audio sensor to facilitate control of notifications, as will be described below.

The system 1140 may further include a video interface 1180 that enables an operation of peripheral device 1130 (e.g., on-board camera) to record still images, video stream, and the like.

A mobile electronic device 1100 implementing the system 1140 may have additional features or functionality. For example, the mobile electronic device 1100 may also include additional data storage devices (removable and/or non-removable) such as, magnetic disks, optical disks, or tape. Such additional storage is illustrated in FIG. 11B by the non-volatile storage area 1160.

Data/information generated or captured by the mobile electronic device 1100 and stored via the system 1140 may be stored locally on the mobile electronic device 1100, as described above, or the data may be stored on any number of storage media that may be accessed by the device via the radio interface layer 1170 or via a wired connection between the mobile electronic device 1100 and a separate electronic device associated with the mobile electronic device 1100, for example, a server computer in a distributed computing network, such as the Internet. As should be appreciated such data/information may be accessed via the mobile electronic device 1100 via the radio interface layer 1170 or via a distributed computing network. Similarly, such data/information may be readily transferred between electronic devices for storage and use according to well-known data/information transfer and storage means, including electronic mail and collaborative data/information sharing systems.

As should be appreciated, FIG. 11A and FIG. 11B are described for purposes of illustrating the present methods and systems and is not intended to limit the disclosure to a particular sequence of steps or a particular combination of hardware or software components.

Figure 12:
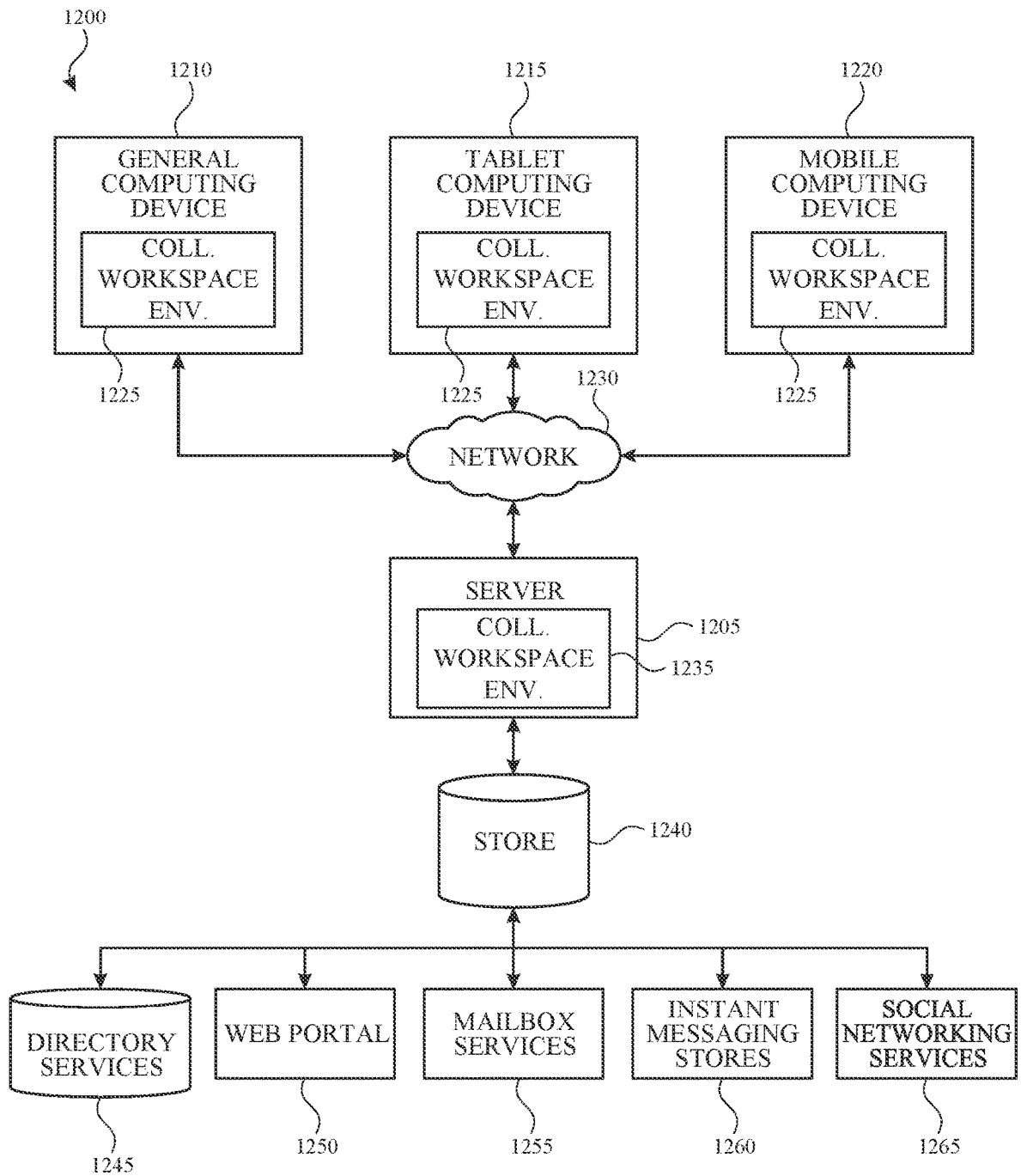

FIG. 12 illustrates one aspect of the architecture of a system 1200 such as described herein. The system may include a general electronic device 1210 (e.g., personal computer), tablet electronic device 1215, or mobile electronic device 1220, as described above. Each of these devices may include an interface for a collaborative workspace environment 1225 such as described above. For example, each device may access a network 1230 to interact with a collaborative workspace environment 1235 hosted by the server 1205.

In some aspects, the collaborative workspace environment 1235 may receive various types of information or content that is stored by the store 1240 or transmitted from a directory service 1245, a web portal 1250, mailbox services 1255, instant messaging stores 1260, or social networking services 1265.

By way of example, the aspects described above may be embodied in a general electronic device 1210 (e.g., personal computer), a tablet electronic device 1215 and/or a mobile electronic device 1220 (e.g., a smart phone). Any of these embodiments of the electronic devices may obtain content from or provide data to the store 1240.

As should be appreciated, FIG. 12 is described for purposes of illustrating the present methods and systems and is not intended to limit the disclosure to a particular sequence of steps or a particular combination of hardware or software components.

Figure 13:
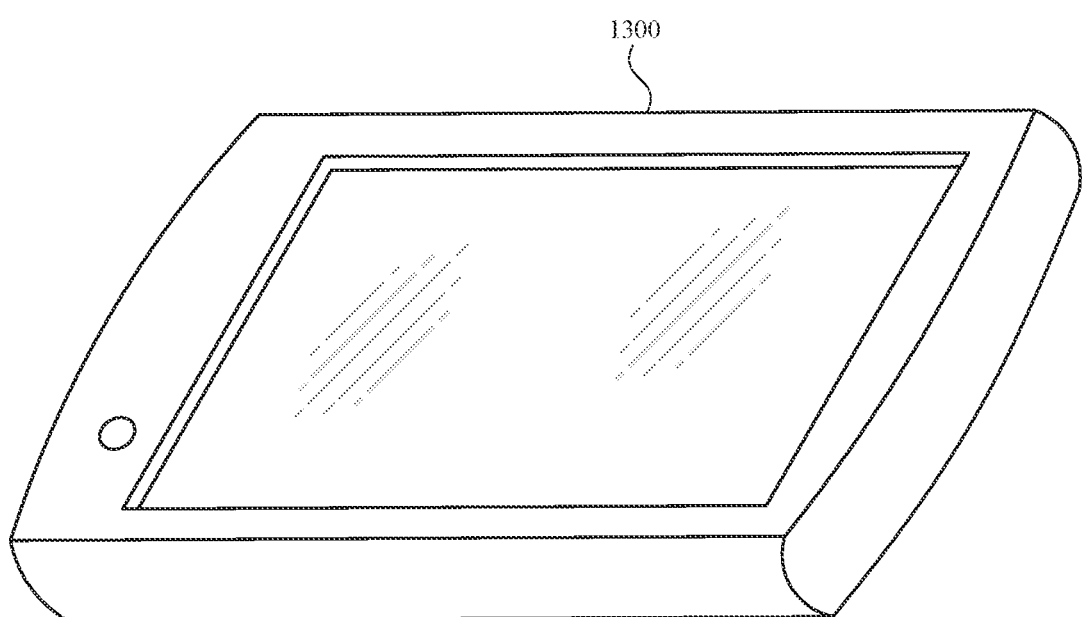

FIG. 13 illustrates an example tablet electronic device 1300 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board electronic device displays or via remote display units associated with one or more electronic devices.

For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated electronic device is equipped with detection (e.g., camera) functionality for capturing and interpreting user gestures for controlling the functionality of the electronic device, and the like.

As should be appreciated, FIG. 13 is described for purposes of illustrating the present methods and systems and is not intended to limit the disclosure to a particular sequence of steps or a particular combination of hardware or software components.

In addition to the examples described above, also described is a system comprising: at least one processing unit; and at least one memory storing computer executable instructions which, when executed by the at least one processing unit, cause the system to provide a user interface for a collaborative workspace environment, the user interface comprising: a first canvas associated with an entity provided by a service in a collaborative workspace environment; a set of commenting tools that enable comments to be provided about the entity; and a second canvas for displaying a representation of the entity and for providing a conversation area for the entity; wherein comments made in the first canvas are reflected in the conversation area of the second canvas and wherein comments made in the conversation area of the second canvas are reflected in the first canvas. In other examples, the system further comprises instructions for causing the user interface to display the first canvas when the representation is selected. In other examples, the conversation area in the second canvas displays comments about the entity. In other examples, the second canvas includes a second representation that is associated with a second entity, wherein the second entity is associated with a third canvas in the user interface. In other examples, the conversation pane is associated with the first canvas, wherein the conversation pane displays comments associated with the entity. In other examples, the system further comprises instructions for providing access to the entity when at least a portion of the comments made in the first canvas or the second canvas is selected.

Also disclosed is a method for displaying input associated with an entity in a collaborative workspace environment, comprising: receiving input in a conversation pane of a first canvas in a user interface of the collaborative workspace environment, wherein the canvas is associated with a particular context; displaying the input in the conversation pane; generating a representation of the input; receiving a selection of a second canvas in the collaborative workspace environment; and displaying the representation in the second canvas. In other examples, the method further comprises receiving additional input in an input area associated with the representation; and displaying the additional input in the representation. In other examples, the method further comprises adding the additional input to the conversation pane of the first canvas. In other examples, the second canvas displays a plurality of representations, wherein each representation is associated with a different canvas. In other examples, the method further comprises receiving a selection of the representation; and displaying the first canvas in the user interface of the collaborative workspace environment. In other examples, the second canvas displays input associated with two or more contexts. In other examples, the input is provided in a conversation pane contained within the entity.

Also described is a computer-readable storage medium encoding computer executable instructions which, when executed by a processing unit, generates a user interface, the user interface comprising: a first canvas having a conversation pane in which input, associated with an entity, is provided; and a second canvas for displaying a representation of the input received in the first canvas; wherein input received in the first canvas is reflected in the representation of the second canvas and wherein input received in the second canvas and associated with the representation is reflected in the first canvas. In other examples, the computer-readable storage further comprises instructions for displaying the second canvas in response to received input. In other examples, the computer-readable storage further comprises displaying the first canvas when the representation is selected. In other examples, the second canvas displays a plurality of representations, wherein each representation of the plurality of representations is associated with a different entity. In other examples, each entity of the different entities is associated with a different canvas. In other examples, the computer-readable storage further comprises instructions for providing access to the entity when at least a portion of the representation is selected. In some examples, the second canvas comprises a conversation area configured to receive the input associated with the representation.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A device comprising:
a processor; and
a non-transitory computer-readable medium in communication with the processor and storing instructions that, when executed by the processor, cause the processor to control the device to perform:
displaying, on a display, a first canvas associated with a first sub-category and configured to display a first conversation related to the first sub-category, the first canvas being one of a plurality of canvases respectively associated with a plurality of sub-categories of a category, each canvas showing a same set of selectable elements respectively linked to a plurality of canvases, wherein the same set of selectable elements includes (1) a first selectable element linked to the first canvas, (2) a second selectable element linked to a second canvas associated with a second sub-category and configured to display a second conversation related to the second sub-category, and (3) a third selectable element linked to a conversation canvas configured to display a plurality of conversations including the first and second conversations respectively displayed on the first and second canvases;
receiving a first user input providing a first text for the first conversation displayed on the first canvas;
in response to receiving the first user input, updating the first conversation displayed on the first canvas to include the first text;
after updating the first conversation to include the first text, receiving a second user input selecting the third selectable element linked to the conversation canvas, wherein the conversation canvas includes a first conversation pane including (1) a first conversation area showing one or more texts including the first text and (2) a first text entry area configured to receive a text input for the first conversation; and
in response to receiving the second user input, displaying, on the display, the conversation canvas showing the plurality of conversations including the first conversation updated to include the first text.

2. The device of claim 1, wherein the instructions, when executed by the processor, further cause the processor to control the device to perform:
after displaying the conversation canvas, receiving a third user input providing a second text for the first conversation shown in the first conversation area included in the first conversation pane of the conversation canvas; and
in response to receiving the third user input, updating the first conversation included in the first conversation pane of the conversation canvas to include the second text.

3. The device of claim 2, wherein the instructions, when executed by the processor, further cause the processor to control the device to perform:
after updating the first conversation to include the second text, receiving a fourth user input to selecting the first selectable element associated with the first canvas; and
in response to receiving the fourth user input, displaying, on the display, the first canvas showing the first conversation updated to include the second text.

4. The device of claim 1, wherein the instructions, when executed by the processor, further cause the processor to control the device to perform:
prior to receiving the second user input, receiving, via a communication network from a remote device, conversation data including a second text for the first conversation; and
in response to receiving the conversation data, updating the first conversation displayed on the first canvas to include the second text.

5. The device of claim 4, wherein, for displaying the conversation canvas in response to receiving the second user input, the instructions, when executed by the processor, further cause the processor to control the device to perform including the first and second texts in the first conversation included in the first conversation pane of the conversation canvas.

6. The device of claim 1, wherein the instructions, when executed by the processor, further cause the processor to control the device to perform:
while the conversation canvas is displayed, receiving a third user input including a second text for the second conversation displayed on the conversation canvas; and
in response to receiving the third user input, updating the second conversation displayed on the conversation canvas to include the second text.

7. The device of claim 6, wherein the instructions, when executed by the processor, further cause the processor to control the device to perform:
after updating the second conversation to include the second text, receiving a fourth user input selecting the second selectable element linked to the second canvas; and
in response to receiving the fourth user input, displaying, on the display, the second canvas showing the second conversation updated to include the second text.

8. The device of claim 1, wherein the first canvas includes a conversation pane including (1) a conversation area showing one or more texts of the first conversation and (2) a text entry area configured to receive a text input for the first conversation.

9. The device of claim 1, wherein the conversation canvas further includes a second conversation pane including (1) a second conversation area showing one or more texts for the second conversation and (2) a second text entry area configured to receive a text input for the second conversation.

10. The device of claim 9, wherein the second canvas includes a conversation pane including (1) a conversation area showing one of more texts of the second conversation and (2) a text entry area configured to receive a text input for the second conversation.

11. A method performed by a device, comprising:
displaying, on a display, a first canvas associated with a first sub-category and configured to display a first conversation related to the first sub-category, the first canvas being one of a plurality of canvases respectively associated with a plurality of sub-categories of a category, each canvas showing a same set of selectable elements respectively linked to a plurality of canvases, wherein the same set of selectable elements includes (1) a first selectable element linked to the first canvas, (2) a second selectable element linked to a second canvas associated with a second sub-category and configured to display a second conversation related to the second sub-category, and (3) a third selectable element linked to a conversation canvas configured to display a plurality of conversations including the first and second conversations respectively displayed on the first and second canvases;
receiving a first user input providing a first text for the first conversation displayed on the first canvas;
in response to receiving the first user input, updating the first conversation displayed on the first canvas to include the first text;
after updating the first conversation to include the first text, receiving a second user input selecting the third selectable element linked to the conversation canvas, wherein the conversation canvas includes a first conversation pane including (1) a first conversation area showing one or more texts including the first text and (2) a first text entry area configured to receive a text input for the first conversation; and
in response to receiving the second user input, displaying, on the display, the conversation canvas showing the plurality of conversations including the first conversation updated to include the first text.

12. The device of claim 11, further comprising:
after displaying the conversation canvas, receiving a third user input providing a second text for the first conversation shown in the first conversation area included in the first conversation pane of the conversation canvas; and
in response to receiving the third user input, updating the first conversation included in the first conversation pane of the conversation canvas to include the second text.

13. The device of claim 12, further comprising:
after updating the first conversation to include the second text, receiving a fourth user input to selecting the first selectable element associated with the first canvas; and
in response to receiving the fourth user input, displaying, on the display, the first canvas showing the first conversation updated to include the second text.

14. The device of claim 11, further comprising:
prior to receiving the second user input, receiving, via a communication network from a remote device, conversation data including a second text for the first conversation; and
in response to receiving the conversation data, updating the first conversation displayed on the first canvas to include the second text.

15. The device of claim 14, displaying the conversation canvas in response to receiving the second user input comprising including the first and second texts in the first conversation included in the first conversation pane of the conversation canvas.

16. The device of claim 11, further comprising:
while the conversation canvas is displayed, receiving a third user input including a second text for the second conversation displayed on the conversation canvas; and
in response to receiving the third user input, updating the second conversation displayed on the conversation canvas to include the second text.

17. The device of claim 16, further comprising:
after updating the second conversation to include the second text, receiving a fourth user input selecting the second selectable element linked to the second canvas; and
in response to receiving the fourth user input, displaying, on the display, the second canvas showing the second conversation updated to include the second text.

18. A non-transitory computer-readable medium comprising instructions that, when executed by a processor, cause the processor to control a device to perform:
displaying, on a display, a first canvas associated with a first sub-category and configured to display a first conversation related to the first sub-category, the first canvas being one of a plurality of canvases respectively associated with a plurality of sub-categories of a category, each canvas showing a same set of selectable elements respectively linked to a plurality of canvases, wherein the same set of selectable elements includes (1) a first selectable element linked to the first canvas, (2) a second selectable element linked to a second canvas associated with a second sub-category and configured to display a second conversation related to the second sub-category, and (3) a third selectable element linked to a conversation canvas configured to display a plurality of conversations including the first and second conversations respectively displayed on the first and second canvases;

receiving a first user input providing a first text for the first conversation displayed on the first canvas;

in response to receiving the first user input, updating the first conversation displayed on the first canvas to include the first text;

after updating the first conversation to include the first text, receiving a second user input selecting the third selectable element linked to the conversation canvas, wherein the conversation canvas includes a first conversation pane including (1) a first conversation area showing one or more texts including the first text and (2) a first text entry area configured to receive a text input for the first conversation; and in response to receiving the second user input, displaying, on the display, the conversation canvas showing the plurality of conversations including the first conversation updated to include the first text.

19. The non-transitory computer-readable medium of claim 18, wherein the instructions, when executed by the processor, further cause the processor to control the device to perform:

after displaying the conversation canvas, receiving a third user input providing a second text for the first conversation shown in the first conversation area included in the first conversation pane of the conversation canvas; and in response to receiving the third user input, updating the first conversation included in the first conversation pane of the conversation canvas to include the second text.

20. The non-transitory computer-readable medium of claim 19, wherein the instructions, when executed by the processor, further cause the processor to control the device to perform:

after updating the first conversation to include the second text, receiving a fourth user input to selecting the first selectable element associated with the first canvas; and in response to receiving the fourth user input, displaying, on the display, the first canvas showing the first conversation updated to include the second text.

* * * * *